United States Patent
Banerjee et al.

(10) Patent No.: US 11,093,549 B2
(45) Date of Patent: Aug. 17, 2021

(54) SYSTEM AND METHOD FOR GENERATING CORRELATION DIRECTED ACYCLIC GRAPHS FOR SOFTWARE-DEFINED NETWORK COMPONENTS

(71) Applicant: VMWARE, INC., Palo Alto, CA (US)

(72) Inventors: Sujeet Banerjee, Bangalore (IN); Umar Shaikh, Bangalore (IN); Amarjeet Singh, Bangalore (IN); Vishnu Kanth Tadipaneni, Bangalore (IN); Sureshbabu Koyadan Chathoth, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 120 days.

(21) Appl. No.: 16/591,654

(22) Filed: Oct. 3, 2019

(65) Prior Publication Data
US 2021/0026895 A1   Jan. 28, 2021

(30) Foreign Application Priority Data
Jul. 24, 2019 (IN) .............................. 201941029991

(51) Int. Cl.
*G06F 16/901* (2019.01)
*H04L 12/24* (2006.01)

(52) U.S. Cl.
CPC ...... *G06F 16/9024* (2019.01); *H04L 41/0806* (2013.01); *H04L 41/20* (2013.01)

(58) Field of Classification Search
CPC . G06F 16/9024; H04L 41/20; H04L 41/0806; H04L 41/0843; H04L 41/12; H04L 41/22; H04L 41/0813
See application file for complete search history.

(56) References Cited

U.S. PATENT DOCUMENTS

| | | | |
|---|---|---|---|
| 6,756,994 B1 * | 6/2004 | Tlaskal | G06T 15/503 345/440 |
| 9,762,450 B2 * | 9/2017 | Xie | H04L 41/0843 |
| 10,547,521 B1 * | 1/2020 | Roy | H04L 43/06 |
| 10,924,346 B1 * | 2/2021 | Banerjee | H04L 41/0806 |
| 2016/0357424 A1 * | 12/2016 | Pang | G06F 3/0482 |
| 2016/0380807 A1 * | 12/2016 | Shevenell | H04L 41/0816 370/252 |
| 2017/0123777 A1 | 5/2017 | Mittal et al. | |

(Continued)

OTHER PUBLICATIONS

Wikipedia, "Software-defined networking", https://en.wikipedia.org/wiki/Software-defined_networking, retrieved Jun. 1, 2020, 7 pgs.
(Continued)

*Primary Examiner* — Michael Won
(74) *Attorney, Agent, or Firm* — Loza & Loza, LLP

(57) ABSTRACT

A computer-implemented system and method for generating a correlation directed acyclic graph (CDAG) of configurations of a software-defined network (SDN) component for migration from a source computing environment to a destination computing environment uses a configuration export file of the SDN component to draw the CDAG. Correlation keys defined in the configuration export file are used to draw graph nodes. Contents associated with the correlation keys and template entries are used to draw edges between at least some of the graph nodes. The CDAG with the graph nodes and the edges is then displayed.

20 Claims, 14 Drawing Sheets

(56) References Cited

U.S. PATENT DOCUMENTS

| | | | |
|---|---|---|---|
| 2017/0250869 A1* | 8/2017 | Voellmy | H04L 43/14 |
| 2018/0034703 A1 | 2/2018 | Anholt et al. | |
| 2019/0052549 A1* | 2/2019 | Duggal | G06Q 30/04 |
| 2019/0230127 A1* | 7/2019 | Gandham | H04L 41/082 |

OTHER PUBLICATIONS

Cisco, "CIS—Cisco Switch backup and restore", https://www.cisco.com/c/en/us/support/docs/ios-nx-ossoftware/ios-software-releases-122-mainline/46741-backup-config.html, retrieved Jul. 1, 2020, updated Aug. 3, 2006, 7 pgs.

Cisco, "Using Templates to Configure Devices", Chapter 21, https://www.cisco.com/c/en/us/td/docs/net_mgmt/prime/infrastructure/3-1/user/guide/pi_ug/config-temp.pdf, retrieved Jul. 1, 2020, 78 pgs.

VMware, "Network and Security Objects", https://docs.vmware.com/en/VMware-NSX-Data-Center-for-vSphere/6.4/com.vmware.nsx.admin.doc/GUID-C0760D51-16F1-43B8-90D8-D39B47249157.html, retrieved Jul. 1, 2020, 2 pgs.

VMware, "Working with Security Groups", https://docs.vmware.com/en/VMware-NSX-Data-Center-for-vSphere/6.4/com.vmware.nsx.admin.doc/GUID-16B3134E-DDF1-445A-8646-BB0E98C3C9B5.html, retrieved Jul. 1, 2020, 2 pgs.

VMware, "NSX-V 6.3: Cross-VC NSX Security Enhancements", https://blogs.vmware.com/networkvirtualization/2017/02/nsx-6-3-cross-vc-nsx-securityenhancements.html/, retrieved Jul. 1, 2020, 12 pgs.

VMware, "NSX API Guide", https://docs.vmware.com/en/VMware-NSX-Data-Center-for-vSphere/6.4/nsx_64_api.pdf, retrieved Jul. 1, 2020, 595 pgs.

Wikipedia, "Tree", https://en.wikipedia.org/wiki/Tree_(graph_theory), retrieved Jul. 1, 2020, 14 pgs.

VMware, "Create an IP Address Group", https://docs.vmware.com/en/VMware-NSX-Data-Center-for-vSphere/6.4/com.vmware.nsx.admin.doc/GUID-D90798B6-C3AF-417D-B23C-6BE5381201AA.html, retrievced Jul. 1, 2020, 2 pgs.

W3C, "XML Path Language (XPath)", Version 1.0, updated Oct. 2016, https://www.w3.org/TR/1999/REC-xpath-19991116/, 35 pgs.

VMware, "Understanding VM snapshots in ESXI (1015180)", https://kb.vmware.com/s/article/1015180, retrieve Jul. 1, 2020, 5 pgs.

Juniper Networks, "Advanced Policy-Based Routing Configuration Settings", https://www.juniper.net/documentation/en_US/cso2.1/topics/reference/general/cp-apbrconfiguration-settings.html, retrieved Jul. 1, 2020, 1 pg.

Wikipedia, "Pushdown automaton", https://en.wikipedia.org/wiki/Pushdown_automaton, retrieved Jul. 1, 2020, 8 pgs.

Goessner, "JSONPath—XPath for JSON", http://goessner.net/articles/JsonPath/, retrieved Jul. 1, 2020, 6 pgs.

Wikipeda, "Lambda calculus", https://en.wikipedia.org/wiki/Lambda_calculus, retrieved Jul. 1, 2020, 17 pgs.

Oracle, "Java Tutorials—Lamda Expressions", https://docs.oracle.com/javase/tutorial/java/javaOO/lambdaexpressions.html, retrieved Jul. 1, 2020, 10 pgs.

Journaldev, "Python XML to JSON, XML to Dict", https://www.journaldev.com/19392/python-xml-to-json-dict, retrieved Jul. 1, 2020, 7 pgs.

Wikipedia, "Subnetwork", https://en.wikipedia.org/wiki/Subnetwork, retrieved Jul. 1, 2020, 8 pgs.

VMware, "xpath-for-json", https://github.com/vmware/xpath-for-json, retrieved Jul. 1, 2020, 2 pgs.

VMware, "Universal Network and Security Objects", https://docs.vmware.com/en/VMware-NSX-for-vSphere/6.2/com.vmware.nsx.admin.doc/GUIDD52361ED-4814-4472-8B29-F22EBDB4A478.html, retrieved Jul. 1, 2020, 1 pg.

Soundarajan, Vijayaraghavan et al. "Simplifying Virtualization Management with Graph Databases", VMware's Technical Journal, 2013, 8 pgs.

Cisco, "Cisco ASA 5500-X with FirePOWER", https://www.cisco.com/c/en_in/products/security/asa-firepower-services/index.html. retrieved Jul. 1, 2020, 14 pgs.

VMware, "VMware Infrastructure (VI) API Reference Documentation", https://www.vmware.com/support/developer/vc-sdk/visdk25pubs/ReferenceGuide/, retrieved Jul. 1, 2020, 1 pg.

VMware, "VMware HCX", https://www.vmware.com/content/dam/digitalmarketing/vmware/en/pdf/products/nsx/vmware-nsx-hybrid-connect-faq.pdf, retrieved Jul. 1, 2020, 2 pgs.

Wikipedia, "Dependency graph", https://en.wikipedia.org/wiki/Dependency_graph#Recognizing_impossible_evaluations, retrieved Jul. 1, 2020, 3 pgs.

Wikipedia, "Directed acyclic graph", https://en.wikipedia.org/wiki/Directed_acyclic_graph, retrieved Jul. 1, 2020, 16 pgs.

Stackoverflow, Diff for Directed Acyclic Graphs:, https://stackoverflow.com/questions/16553343/diff-for-directed-acyclic-graphs, retrieved Jul. 1, 2020, 4 pgs.

* cited by examiner

```
{
    "metadata" : {
        "edge_0" : {
            "type" : "edge",
            "oldValue" : "edge-17",
            "scope" : "self"
        },
        "interface_0" : {
            "type" : "interface",
            "oldValue" : "vNic_0",
            "ipAddresses" :
"172.23.45.5V24;10.20.13.1,10.20.13.60,10.20.13.56V24",
            "vnicType" : "uplink",
            "scope" : "network-27"
        },
```

FIG. 3A

```
"interface_1": {
    "type": "interface",
    "oldValue": "vNic_1",
    "ipAddresses":
"10.45.1.5,10.45.1.7,10.45.1.6\6/24;20.45.1.5,20.45.1.7,20.45.1.6V24
",
    "vnictype": "internal",
    "scope": "virtualwire-6"
},
"firewall_0": {
    "type": "firewall",
    "oldValue": "131077",
    "scope": "$ (edge_0)"
},
"firewall_1": {
    "type": "firewall",
    "oldValue": "131078",
    "scope": "$ (edge_0)"
},
"ip_0": {
    "type": "ip",
    "oldValue": "20.45.1.6",
    "oldSubnet": "20.45.1.5,20.45.1.6V24",
    "lambda": "x => { select value from x . Value}",
    "scope": "$ (interface_1)",
},
"ip_0": {
    "type": "ip",
    "oldValue": "172.34.6.32",
    "userInputNeeded": true,
    "scope": "external"
},
"ipset_0": {
    "type": "ipset",
    "oldValue": "ipset-18",
    "name": "App Server"
},
"ipset_0": {
    "type": "ipset",
    "oldValue": "ipset-17",
    "name": "Web Server"
},
"ip_2": {
    "type": "ip",
    "oldValue": "10.20.13.60",
    "oldSubnet": "10.20.13.1,10,20.13.60.10.20.13.56V24",
    "lambda": "x => { select value from x . Value}",
    "scope": "$ (interface_0)",
},
"ip_3": {
    "type": "ip",
    "oldValue": "10.20.13.56",
    "oldSubnet": "10.20.13.1,10,20.13.60.10.20.13.56V24",
    "lambda": "x => { select value from x . Value}",
    "scope": "$ (interface_0)",
}
},
"templates": [
    {
```

FIG. 3B

```
        "type" : "interface",
        "payload" : {
            "label" : "$(interface_0)",
            "name" : "uplink",
            //other details specific to interface
            "portgroupId" : "network-27",
            "portgroupName" : "VM Network"
        }
    },
    {
        "type" : "interface",
        "payload" : {
            "label" : "$(interface_1)",
            "name" : "INT VLAN 45",
            //other details specific to interface
            "portgroupId" : "virtualwire-6"
        },
        "scope" : "virtualwire-6"
    },
    {
        "type" : "ip",
        "scope" : "$(interface_1)",
        "payload" : {
            "ip" : "$(ip_0)",
            "scope" : "$(interface_1)"
        }
    },
    {
        "type" : "Ip",
        "scope" : "external",
        "payload" : {
            "ip" : "$(ip_1)",
            "scope" : "external"
        }
    },
    {
        "type" : "Ip",
        "scope" : "$(interface_0)",
        "payload" : {
            "ip" : "$(ip_2)",
            "scope" : "external"
        }
    },
    {
        "type" : "Ip",
        "scope" : "$(interface_0)",
        "payload" : {
            "ip" : "$(ip_3)",
            "scope" : "external"
        }
    },
    {
        "type" : "ipset",
        "scope" : "edge-17",
        "payload" : {
            "objectId" : "$(ipset_0)",
            "name" : "App server",
            "value" : "$(ip_2)"
        }
    }
```

FIG. 3C

```
        },
        {
            "type": "ipset",
            "name": "Web Server",
            "scope": "edge-17",
            "payload": {
                "objectId": "$ (ipset_1)",
                "name": "Web Server",
                "value": "$ (ip_3)"
            }
        },
        {
            "type": "fireWall",
            "payload": {
                "ruleId": "$ (firewall_0)",
                "ruleTed": 131077,
                "name": "App and Web to DB",
                "action": "accept",
                "source": {
                    "exclude": false,
                    "ipAddress": [],
                    "groupingObjectId": [
                        "$ (ipset_1)",
                        "$ (ipset_0)",
                    ]
                },
                "defaultPilicy": {
                    "action": "deny",
                    "loggingEnablrd": false
                }
            }
        },
        {
            "type": "fireWall",
            "payload": {
                "ruleId": "$ (firewall_1",
                "ruleTed": 131078,
                "name": "Dynamic Routing",
                "source": {
                    "exclude": false,
                    "ipAddress": [,
                        "$ (ip_1)"
                    ],
                    "groupingObjectId": [
                        "$ (ipset_1)",
                    ],
                    "vnicGroupId": []
                },
                "destination": {
                    "exclude": false,
                    "ipAddress": [,
                        "$ (ip_1)"
                    ],
                    "groupingObjectId": [
                    "vnicGroupId": []
                }
            }
        }
    ]
```

FIG. 3D

SYSTEM AND METHOD FOR GENERATING CORRELATION DIRECTED ACYCLIC GRAPHS FOR SOFTWARE-DEFINED NETWORK COMPONENTS

RELATED APPLICATIONS

Benefit is claimed under 35 U.S.C. 119(a)-(d) to Foreign Application Serial No. 201941029991 filed in India entitled "SYSTEM AND METHOD FOR GENERATING CORRELATION DIRECTED ACYCLIC GRAPHS FOR SOFTWARE-DEFINED NETWORK COMPONENTS", on Jul. 24, 2019, by VMWARE, Inc., which is herein incorporated in its entirety by reference for all purposes.

The present application is related in subject matter to U.S. patent application Ser. No. 16/591,647, U.S. patent application Ser. No. 16/591,662, which is incorporated herein by reference.

BACKGROUND

Virtual routers and edge-gateways form an important part of software-defined networking (SDN) in a cloud computing environment, such as a private, public or hybrid (private and public) cloud computing environment. In a hybrid cloud infrastructure, these SDN components (e.g., routers and edge-gateways) carry more context than just the state of individual configured-services. The context, for instance, also includes the information of the layer at which an SDN component is working and of the peers with which the SDN component is operating. Together, the SDN components form an ecosystem in a cloud computing environment.

Similar to virtual machines, which can be spawned and removed in extremely large numbers, the SDN components can be spun-up or configured on the fly. However, unlike virtual machines, the configurations of SDN components heavily depend on their operating context (e.g., interface configurations, hierarchy, peer-networks and SDN-controller states). While backup-restore or versioning of virtual machines can be achieved in various ways (e.g., changed block tracking (CBT), snapshotting etc.), the same techniques will not work for SDN component configurations due to hugely interdependent systems and subsystems within SDN.

In addition, due to the complexity in migrating configurations of SDN components from one computing environment to another computing environment, network administrators have difficulty in planning, evaluating and addressing various issues for such migrations.

SUMMARY

A computer-implemented system and method for generating a correlation directed acyclic graph (CDAG) of configurations of a software-defined network (SDN) component for migration from a source computing environment to a destination computing environment uses a configuration export file of the SDN component to draw the CDAG. Correlation keys defined in the configuration export file are used to draw graph nodes. Contents associated with the correlation keys and template entries are used to draw edges between at least some of the graph nodes. The CDAG with the graph nodes and the edges is then displayed.

A computer-implemented method for generating a CDAG of configurations of a software-defined network (SDN) component in accordance with an embodiment of the invention comprises drawing graph nodes for correlation keys defined in a configuration export file of the SDN component, the configuration export file including information to configure the SDN component in a computing environment, when contents associated with a correlation key reference another correlation key, drawing an edge from a graph node of the another correlation key to a graph node of the correlation key, when a template entry corresponding to a particular correlation key in the configuration export file references another particular correlation key that represents a dependency of the SDN component, drawing another edge from a graph node of the particular correlation key to a graph node of the another particular correlation key, and displaying the CDAG with the graph nodes and the edges, wherein the graph nodes illustrate dependencies of the configurations of the SDN components and the edges between the graph nodes illustrate relationships between some of the dependencies. In some embodiments, the steps of this method are performed when program instructions contained in a non-transitory computer-readable storage medium are executed by one or more processors.

A system in accordance with an embodiment of the invention comprises memory and at least one processor configured to draw graph nodes for correlation keys defined in a configuration export file of a software-defined network (SDN) component, the configuration export file including information to configure the SDN component in a computing environment, when contents associated with a correlation key reference another correlation key, draw an edge from a graph node of the another correlation key to a graph node of the correlation key, when a template entry corresponding to a particular correlation key in the configuration export file references another particular correlation key that represents a dependency of the SDN component, draw another edge from a graph node of the particular correlation key to a graph node of the another particular correlation key, and display the CDAG with the graph nodes and the edges, wherein the graph nodes illustrate dependencies of the configurations of the SDN components and the edges between the graph nodes illustrate relationships between some of the dependencies.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which:

FIGS. 3A-3D shows a practical configuration export JSON file in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
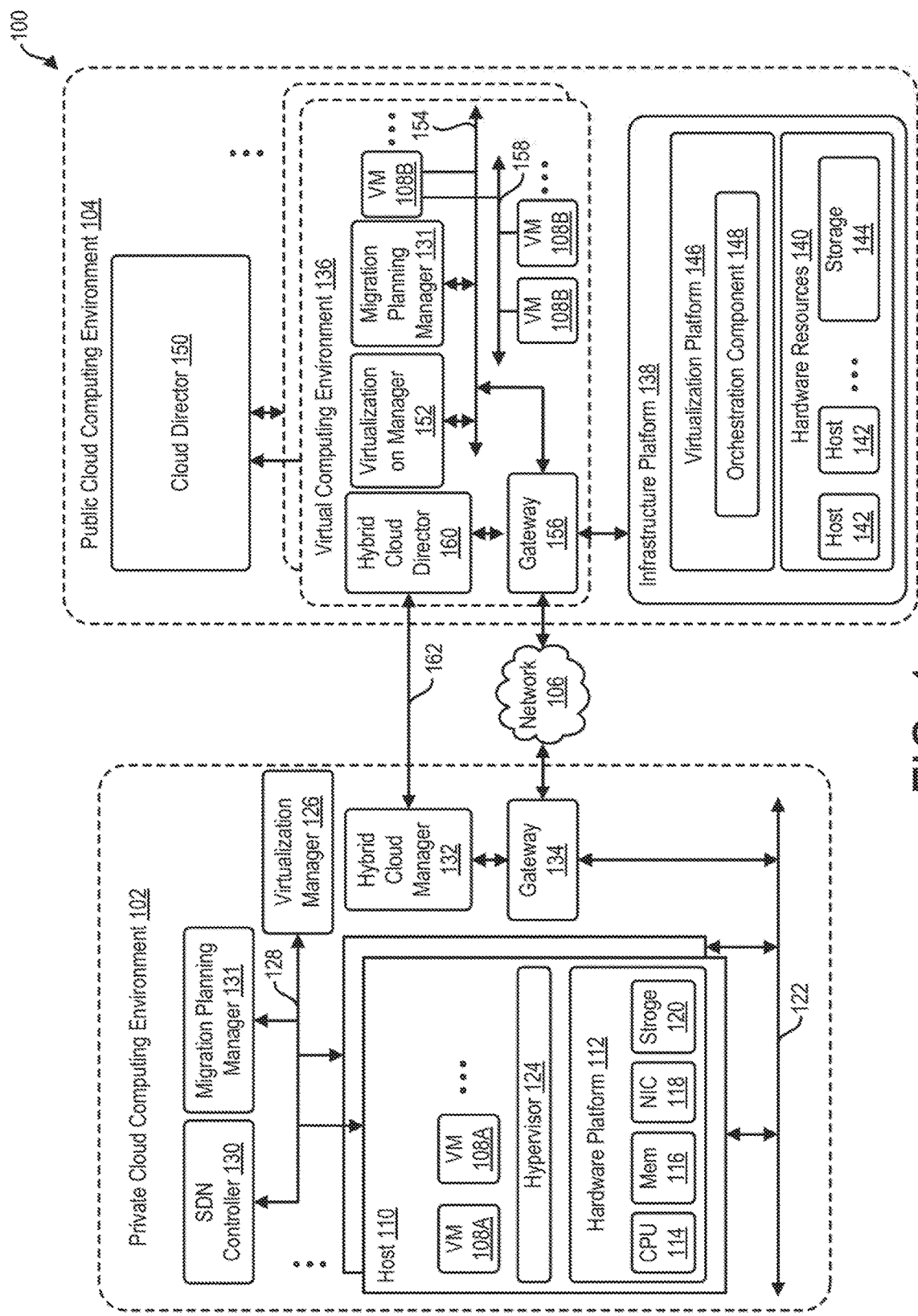
FIG. 1 is a block diagram of a computing system with a migration planning manager in accordance with an embodiment of the invention.

Turning now to FIG. 1, a block diagram of a computing system 100 in accordance with an embodiment of the invention is shown. The computing system may be a hybrid cloud computing system, which includes at least one private cloud computing environment 102 and at least one public cloud computing environment 104 that are connected to each other via a network 106. The computing system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders, such as the particular enterprise in addition to other enterprises. In some embodiments, the private cloud computing environment may be a private or on-premise data center. The network 106 can be any type of computer network or a combination of networks that allows communications between devices connected to the network. The network may include the Internet, a wide area network (WAN), a local area network (LAN), a storage area network (SAN), a fibre channel network and/or other networks. The network may be configured to support protocols suited for communications with storage arrays, such as Fibre Channel, Internet Small Computer System Interface (iSCSI), Fibre Channel over Ethernet (FCoE) and HyperSCSI. The license server may be located within the private cloud computing environment or the public cloud computing environment.

The private and public cloud computing environments 102 and 104 of the computing system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

In some embodiments, the computing system 100 supports migration of the virtual machines 108 between the private and public cloud computing environments 102 and 104. The computing system may also support migration of the virtual machines between different sites situated at different physical locations, which may be computing environments in the private and/or public cloud computing environments.

As shown in FIG. 1, the private cloud computing environment 102 of the computing system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other input/output devices such as, for example, a mouse and a keyboard (not shown). The processor is configured to execute instructions, for example, executable instructions that perform one or more operations described herein and may be stored in the system memory and/or the storage system. In some embodiments, the system memory is volatile memory used for retrieving programs and processing data. The system memory may include, for example, one or more random access memory (RAM) modules. The network interface enables the host to communicate with another device via a communication medium, such as a network 122 within the private cloud computing environment. The network interface may be one or more network adapters, also referred to as a Network Interface Card (NIC). The storage system represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In an embodiment, the virtualization manager is a computer program that resides and executes in a computer system, such as one of the hosts, or in a virtual computing instance, such as one of the virtual machines 108A running on the hosts. One example of the virtualization manager is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In the illustrated embodiment, the private cloud computing environment 102 also includes an SDN controller 130 and a migration planning manager 131 connected to the management network 128. The SDN controller operates to control SDN networks, e.g., software-defined data centers (SDDCs), in the private cloud computing environment. Thus, the SDN controller manages SDN components, such as virtual routers and edge gateways, in private cloud computing environment to support the SDN networks in the private cloud computing environment. In some embodiments, there may be more than one SDN controller in the private cloud computing environment, which form a SDN controller plane.

The migration planning manager 131 operates to generate CDAGs of configurations of SDN components, such as virtual routers and edge gateways, to be migrated from one computing environment to another, e.g., from one SDDC in a computing environment to another SDDC in the same or different computing environment. As used herein, configurations of SDN components may include rules and network policies that are followed or executed by the SDN components, as well as settings and parameters for the SDN component. Migration of SDN component configurations allows corresponding SDN components to be readily spawned or deployed in different computing environments, which can properly perform the same tasks as the original SDN components in the new computing environments. The CDAGs generated by the migration planning manager allow administers to analyze such SDN migrations for planning, evaluating and addressing various issues that can arise in SDN migrations. In an embodiment, the migration planning manager may be implemented as software running on one or more computer systems, which may be physical computers, such as the host computer 110, or virtual computers, such as the virtual machines 108. As illustrated in FIG. 1, there may be other migration planning managers 131 in the public cloud computing environment 104 for multi-cloud application. The migration planning manager is described in more detail below.

In one embodiment, the private cloud computing environment 102 includes a hybrid cloud manager 132 configured to manage and integrate computing resources provided by the private cloud computing environment with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In some embodiments, the hybrid cloud manager is a virtual appliance, which may include a collection of applications or services. In one implementation, the hybrid cloud manager is a module or plug-in to the virtualization manager 126, although other implementations may be used, such as a separate computer program executing in any computer system or running in a virtual machine in one of the hosts. One example of the hybrid cloud manager is the VMware® Hybrid Cloud Extension (HCX) HCX™ product made available from VMware, Inc.

In one embodiment, the hybrid cloud manager 132 is configured to control network traffic into the network 106 via a gateway device 134, which may include a virtual appliance. The gateway device 134 is configured to provide the virtual machines 108A and other devices in the private cloud computing environment 102 with connectivity to external devices via the network 106. The gateway device 134 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the computing system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage systems 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment may be VMware cloud (VMC) on Amazon Web Services (AWS).

In one embodiment, at least some of the virtual computing environments 136 may be configured as SDDCs. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one gateway device 156, as well as one or more isolated internal networks 158 not connected to the gateway device 156. The gateway device 156, which may include a virtual appliance, is configured to provide the virtual machines 108B and other components in the virtual computing environment with connectivity to external devices, such as components in the private cloud computing environment via the network 106. The gateway device 156 operates in a similar manner as the gateway device 134 in the private cloud computing environment.

In one embodiment, each of the virtual computing environments 136 in the public cloud computing environment 104 includes a hybrid cloud director 160 configured to communicate with the corresponding hybrid cloud manager 132 in the private cloud computing environment 102 to enable a common virtualized computing platform between the private and public cloud computing environments. In some embodiments, the hybrid cloud manager is a virtual appliance, which includes a collection of applications or services. The hybrid cloud director may communicate with the hybrid cloud manager 132 using Internet-based traffic via a VPN tunnel established between the gateways 134 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director may be a component of the HCX-Cloud product and the hybrid cloud manager may be a component of the HCX-Enterprise product, which is provided by VMware, Inc.

The process of migrating configurations of SDN components, such as virtual routers and edge gateways, in the computing system 100 is very complex due to the dependencies of the SDN component being migrated to other components in the surrounding computing environment. Currently, there exists no system or planner for migrating bulk of the configurations of an SDN component, such as network and router polices, that brings to the user a view of the underlying systems or sub-systems in a single-pane-of-glass, and without having to go deep into the bulk of syntax of the underlying configurations. The operations required during planning and execution of such migrations are highly manual and iterative, and may take months, depending on the bulk of the configurations and other factors (e.g., resources). These operations can be summarized as follows:

1. A set of highly iterative operations to fetch all the configurations and its dependencies.

2. Manually linking the configurations and nested dependencies. There are tools to templatize it, but these tools generate a huge number of data points, which are left for the user or network administrator to map. Thus, managing large hybrid cloud environments backed by SDN using these tools are practically impossible.

3. Mapping correct data points by the user or network administrator to come up with updated configuration specifications, which is vulnerable for human errors that would be hard to find after migration.

4. A set of highly iterative operations to import the updated specifications.

5. A set of highly iterative validations after the import.

In addition, over time, with new members joining the administration team, the context of why there are certain policies and configurations is gradually lost. This poses a big challenge for policy migration since no one would know if changing certain values in one part of the configuration may imply related changes to be done elsewhere or not.

The migration planning manager 131 operates to provide the means for users or network administrators to analyze configurations SDN components with their dependencies so that the SDN configurations can be properly migrated to various destination computing environments. The migration planning manager uses a configuration export file to automatically generate a CDAG of all the dependencies of an SDN component being migrated. A configuration export file of an SDN component includes all the information needed to configure the SDN component in a new destination computing environment to function in the same manner as in the source computing environment.

Figure 2:
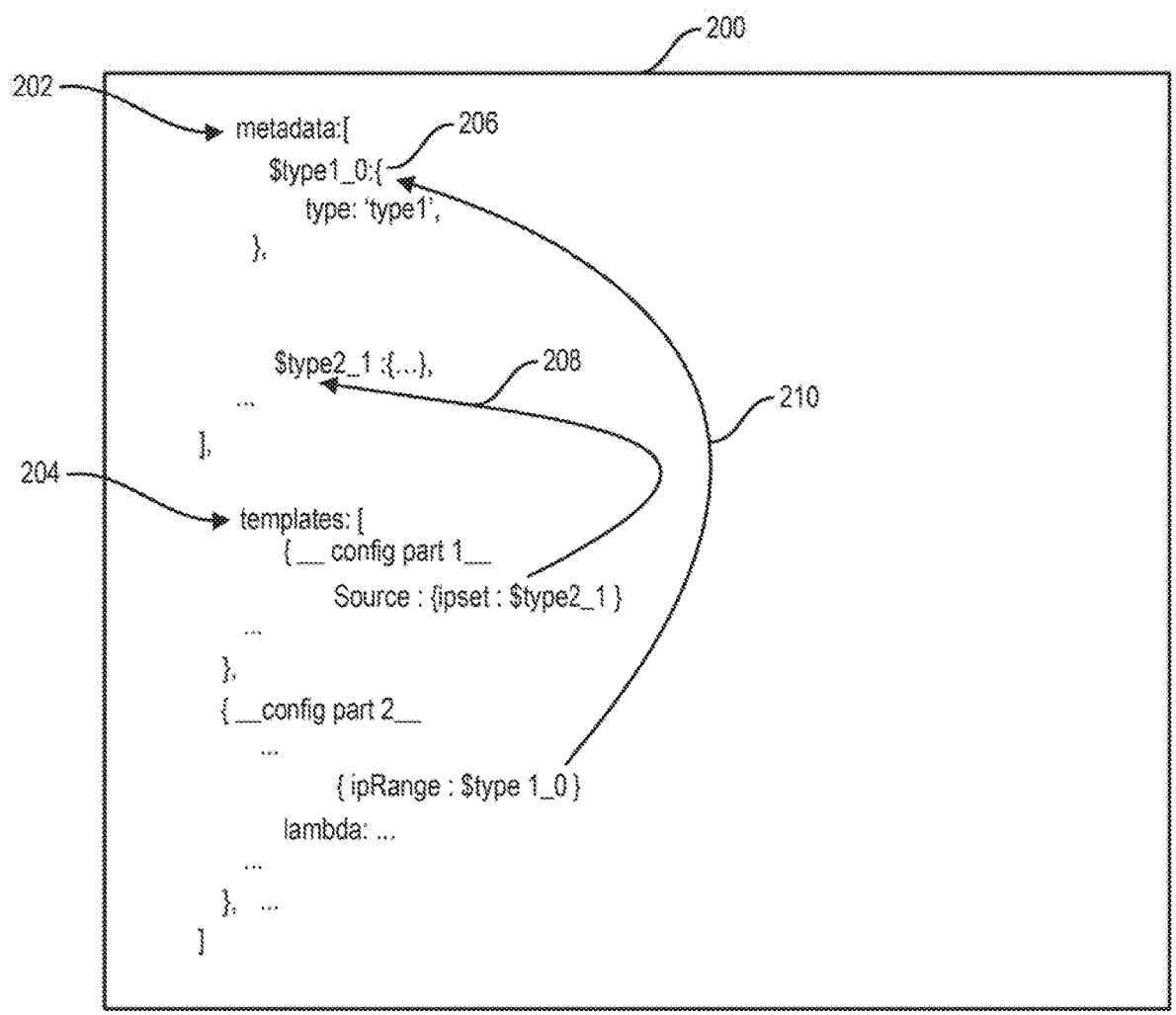
FIG. 2 shows a generic configuration export JSON file for an SDN component in accordance with an embodiment of the invention.

A generic configuration export JSON file 200 for an SDN component in accordance with an embodiment of the invention is illustrated in FIG. 2. As shown in FIG. 2, the configuration export JSON file 200 in accordance with an embodiment of the invention includes a metadata section 202 and a templates section 204. The metadata section includes a list of correlation keys 206, which represent dependencies of the SDN component. The templates section includes reframed configurations or parts of configurations ("templates") with references to the correlation keys in the metadata section, as illustrated by arrows 208 and 210 in FIG. 2. Original values in these templates are replaced by references to the corresponding correlation keys. The contents in these sections of the configuration export JSON file will be further described below.

In an embodiment, the configuration export JSON file may be automatically generated using techniques described in a simultaneously filed patent application, titled "System and Method for Migrating Configurations of Software-Defined Network Components," which is assigned to the same applicant as this patent application and incorporated herein by reference. However, the configuration export JSON file may be generated using other techniques, and even by a manual process.

A practical example of a configuration export JSON file in accordance with an embodiment of the invention is illustrated in FIGS. 3A-3D. As shown in FIGS. 3A-3D, the configuration export JSON file includes a metadata section with a number of correlation keys and a templates section with a number of template entries. Each of the correlation keys includes contents associated with the correlation key. The contents of each correlation key include at least "type" and "oldvalue" of the correlation key. The "type" is a description of the type of dependency represented by the correlation key. The "oldvalue" is the original or initial value of the correlation key at the source computing environment. Each of the template entries includes an identifier of the template entry and a reference to at least one correlation key. The identifier of a template entry is found as the first element in the payload, which can be "label", "ip", "objected" or "ruleId" in this correlation export JSON file. Each reference to a correlation value is marked by the symbol "$" followed by the correlation key in parentheses. It is noted here that a reference is made to the identifier of each template entry.

The configuration export file of an SDN component is based on a model of configurations for an SDN component in a computing environment. This model is a tree structure, which shows all the dependencies of an SDN component. An example of such tree structure for an SDN component, e.g., a virtual router, is shown in FIG. 4.

Figure 4:
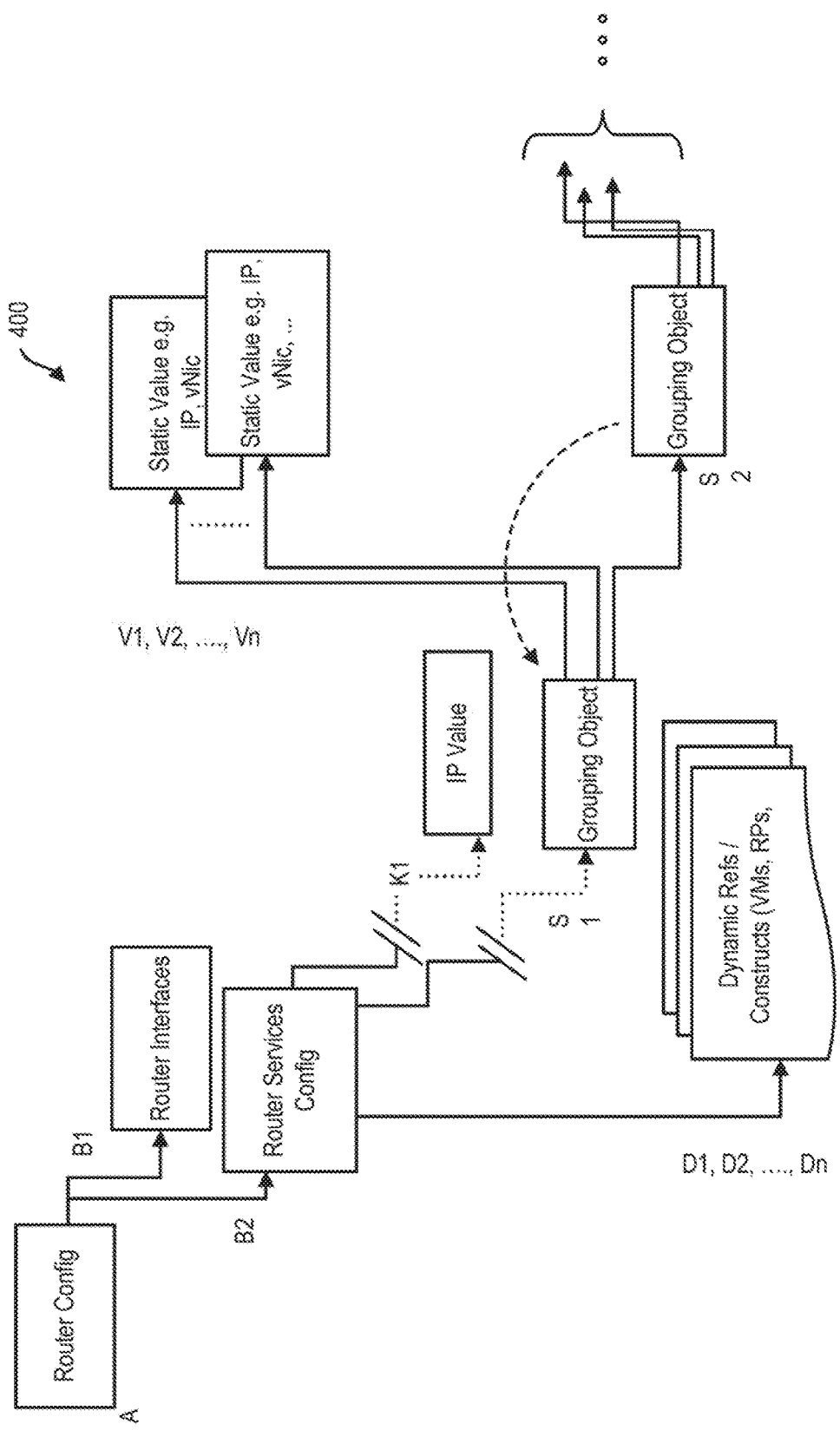
FIG. 4 is a diagram of a tree of constructs that can be used to visualize a router configuration in accordance with an embodiment of the invention.

As illustrated in FIG. 4, a virtual router configuration can be visualized as a tree 400 of constructs, each representing a dependency of the virtual router, in accordance with an embodiment of the invention. The root of the tree 400 is a router configuration A. The other constructs of the tree 400 include router interfaces B1, a router services configuration B2, dynamic references/constructs D1, . . . , Dn (e.g., virtual machines and resource pools), an IP value K1, grouping objects S1, . . . , Sn, and static values V1, . . . , Vn (e.g., IP values and vNic values). Note that grouping objects can refer to other grouping object, e.g., the grouping object S2 referring to the grouping object S1. Thus, FIG. 4 illustrates the potential complexity of router configurations with hierarchy of grouping objects nested within each other. This can make the configurations highly interdependent and potentially boundless, and thus makes migration a daunting task, having to go through a bulk of scattered configurations across various systems in their native syntax.

Using a configuration export file of an SDN component, such as the configuration export JSON file shown in FIGS. 3A-3D, the migration planning manager 131 will automatically generate a CDAG of the SDN component, which will include graph nodes representing the dependencies of the SDN component, as well as other visual information regarding the dependencies and their relationships between them. A CDAG of an SDN component, e.g., a virtual router, using the configuration export JSON file (shown in FIG. 3) in accordance with an embodiment of the invention is illustrated in FIG. 5.

Figure 5:
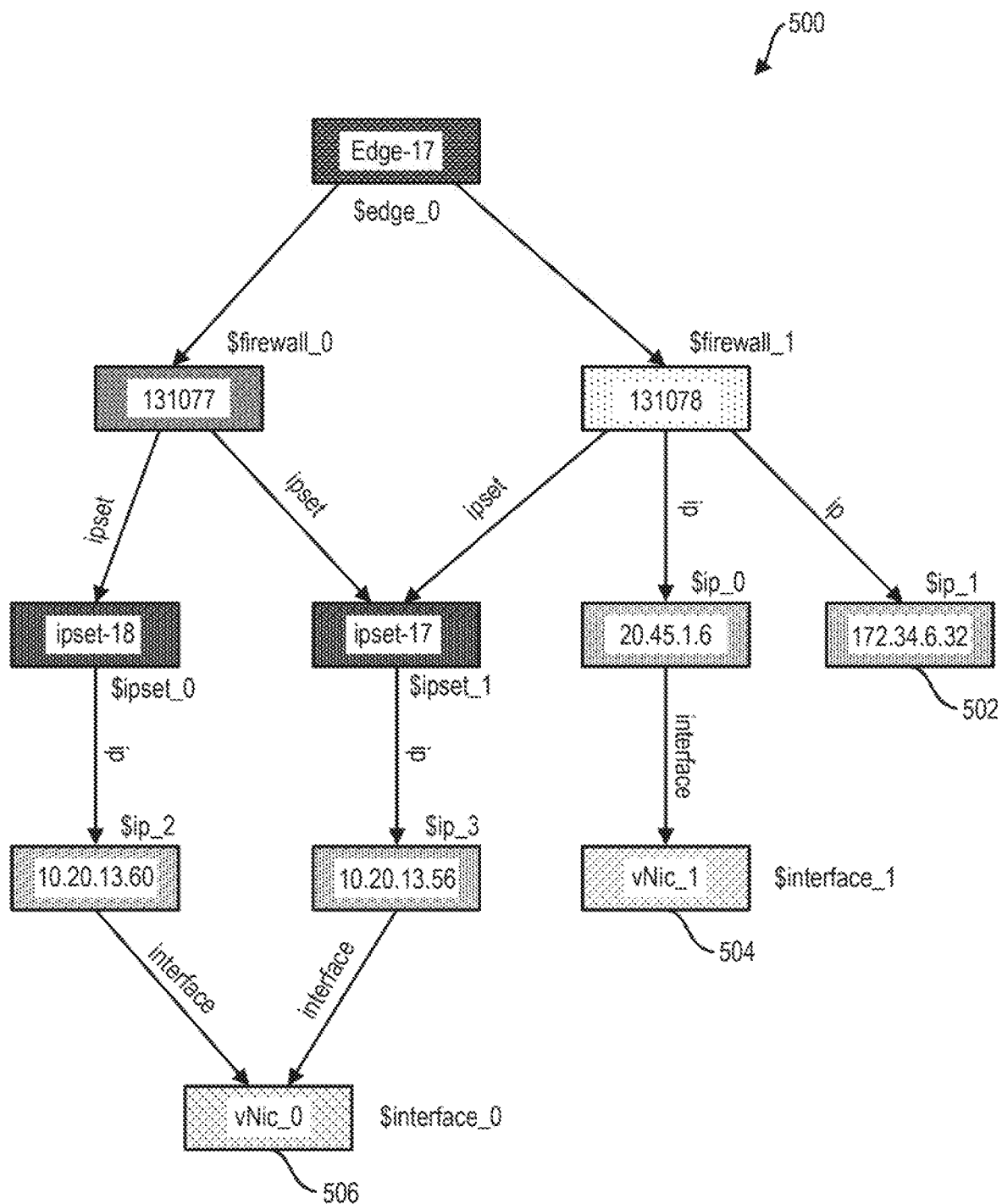
FIG. 5 is a diagram of a CDAG of an SDN component, e.g., a virtual router, using the configuration export file (shown in FIG. 3) in accordance with an embodiment of the invention.

As shown in FIG. 5, a CDAG 500 of a virtual router includes nodes that represent dependencies of the virtual router and edges connecting the various nodes to show dependencies that reference other dependencies. In addition, the CDAG includes text on the edges to show the types of dependencies that are being referenced by higher dependencies. The CDAG includes three nodes 502, 504 and 506 that are drawn with bold borders. These nodes are nodes with no correlations, and are thus, visually indicated as such.

Figure 6:
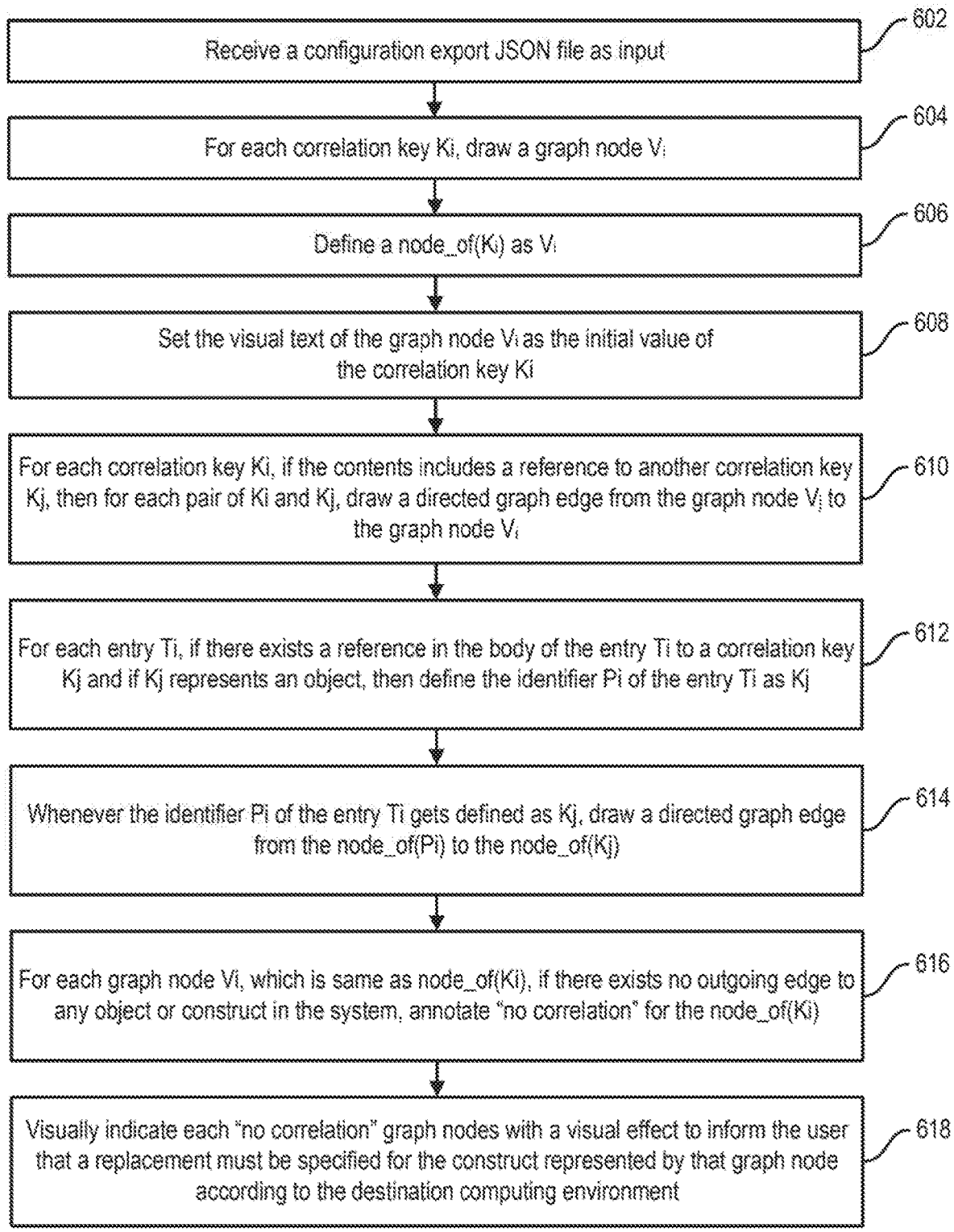
FIG. 6 is a process flow diagram of an operation of the migration planning manager to build a CDAG of an SDN component in a computing environment using a configuration export file in accordance with an embodiment of the invention.

An operation of the migration planning manager 131 to build a CDAG of an SDN component in a computing environment using a configuration export file in accordance with an embodiment of the invention is described with reference to a process flow diagram of FIG. 6. The operation is executed in multiple passes on the configuration export file, which is described as being a configuration export JSON file. The operation begins at block 602, where the configuration export JSON file is received as input at the migration planning manager 131. The migration planning manager will typically talk to multiple clouds, and will apply/extract configuration JSONs to respective clouds or infrastructure-providers, either with the help of native export and import modules, or alternatively, with the application of techniques described in a simultaneously filed patent application, titled "System and Method for Migrating Configurations of Software-Defined Network Components," which is assigned to the same applicant as this patent application and incorporated herein by reference.

The first pass on the configuration export JSON file involves blocks 604-608. At block 604, for each correlation key $K_i$ defined in the metadata section of the configuration export JSON file, a graph node $V_i$ is drawn, i.e., electronically created. As an example, each graph node is drawn on a white board or a user interface canvas as a predefined shape, such as an ellipse or a circle. Next, at block 606, a node_of($K_i$) is defined as $V_i$. The node of ($K_i$) is a function that takes the correlation key $K_i$ and outputs a graph node corresponding to the correlation key Next, at block 608, the visual text of the graph node $V_i$ is set as the initial value (or source-side value) of the correlation key $K_i$ so that a user can easily identify the nodes based on their initial values.

Figure 7A:
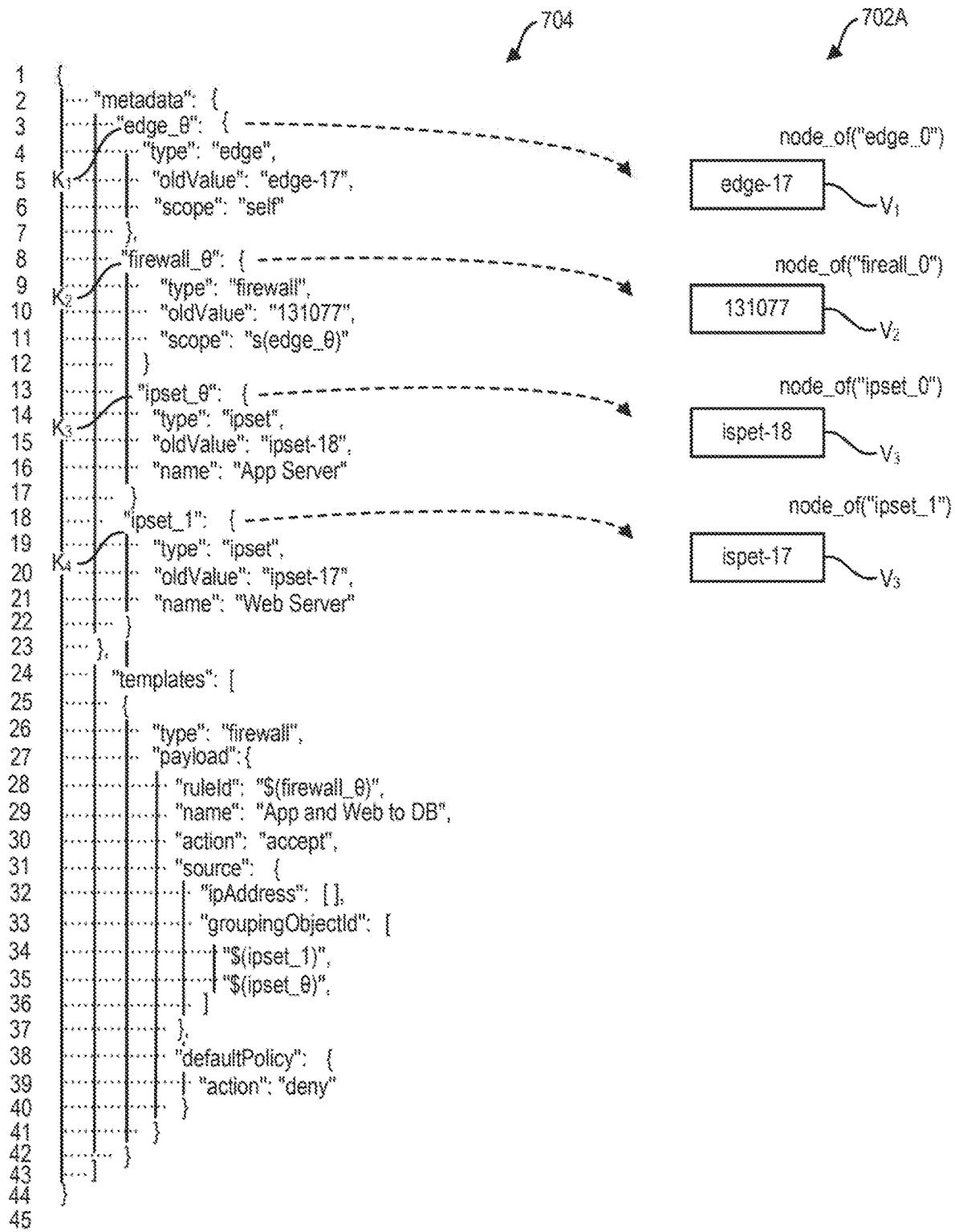
FIG. 7A-7C illustrate a CDAG being built as a result of processes of the operation of the migration planning manager in accordance with an embodiment of the invention.

FIG. 7A illustrates an example of a CDAG 702A resulting from the first pass on a partial correlation export JSON file 704 in an accordance with an embodiment of the invention. In this example, there are four correlation keys $K_1$-$K_4$ in the metadata section of the correlation export JSON file. The four correlation keys $K_1$-$K_4$ are edge_0, firewall_0, ipset_0 and ipset_1, respectively. Thus, four graph nodes $V_1$-$V_4$ have been drawn. As illustrated, each graph node is indicated by a corresponding node_of($K_i$). Thus, the graph nodes $V_1$-$V_4$ are indicated by the node_of("edge_0"), the node_of("firewall_0"), the node_of("ipset_0") and the node_of("ipset_1"), respectively. In addition, the visual text of the graph nodes $V_1$-$V_4$ are set to their initial value (shown as "oldValue" in the confirmation export JSON file). Thus, the visual text of the graph nodes $V_1$-$V_4$ are set to "edge-17", "131077", "Ipset-18" and "Ipset-17", respectively.

The second pass on the configuration export JSON file involves block 610. At block 610, for each correlation key $K_i$, if the contents associated with that correlation key in the metadata section of the configuration export JSON file (e.g., Lambda, Type, Scope etc. defined against the correlation key in the metadata section) includes a reference to another correlation key $K_j$, then for each pair of $K_i$ and $K_j$, a directed graph edge is drawn from the graph node $V_j$ to the graph node $V_i$.

Figure 7B:
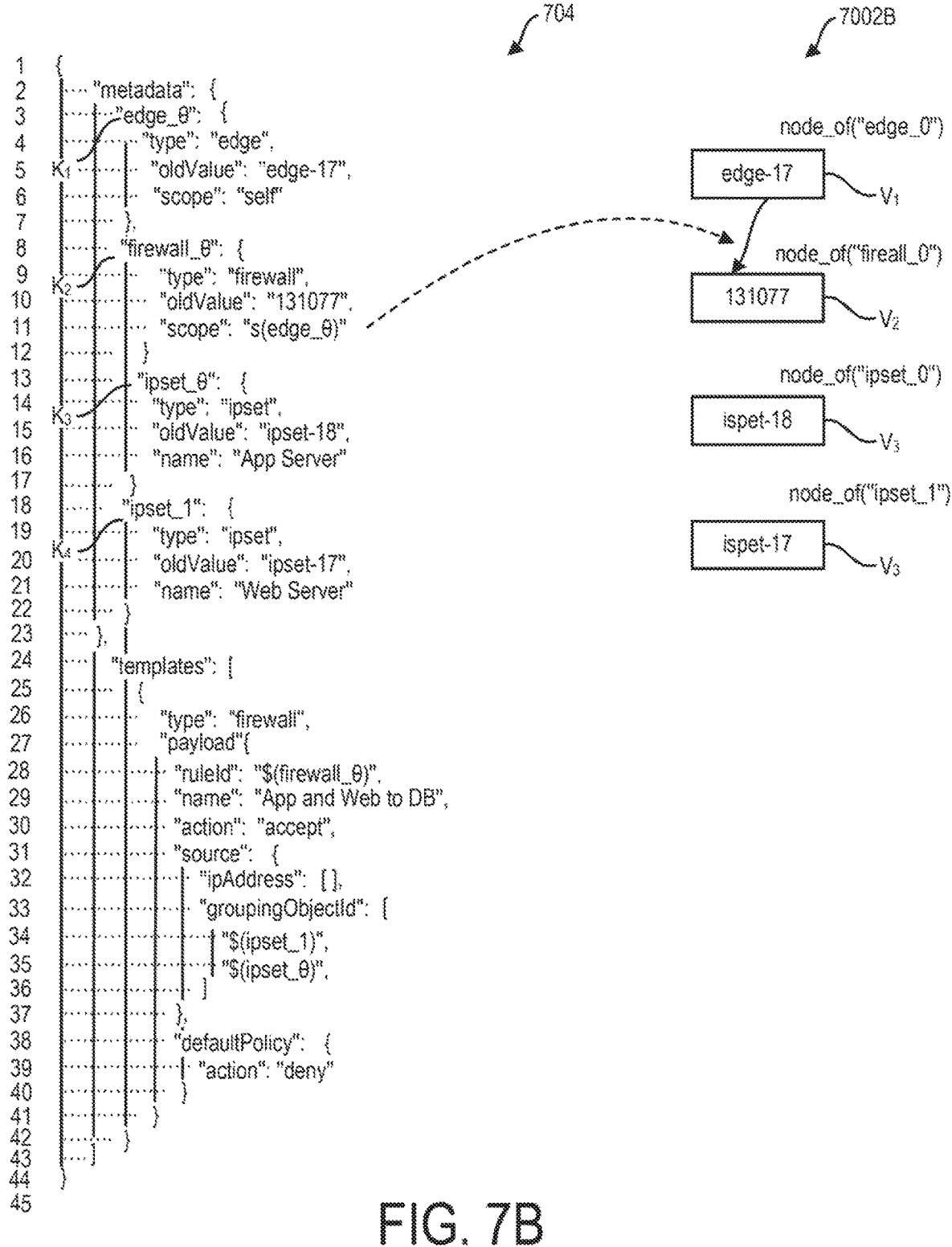

FIG. 7B illustrates a CDAG 702B resulting from the second pass on the correlation export JSON file 704 in an accordance with an embodiment of the invention. In this figure, the correlation key $K_2$, i.e., "firewall_0", includes a reference to "edge_0", which is the correlation key $K_1$. Thus, an edge is drawn from the graph node $V_1$ to the graph node $V_2$.

The third pass on the configuration export JSON file involves blocks 612 and 614. At block 612, for each entry $T_i$ in the templates section of the configuration export JSON file, if there exists a reference in the body of the entry $T_i$ to a correlation key Kj and if Kj represents an object, as indicated by "Id" or "objectId" in the body of $T_i$, then the identifier $P_i$ of the entry $T_i$ is defined as $K_j$. Next, at block 614, whenever the identifier $P_i$ of the entry $T_i$ gets defined as $K_j$, a directed graph edge is drawn from the node_of($P_i$) to the node_of(Kj).

Figure 7C:
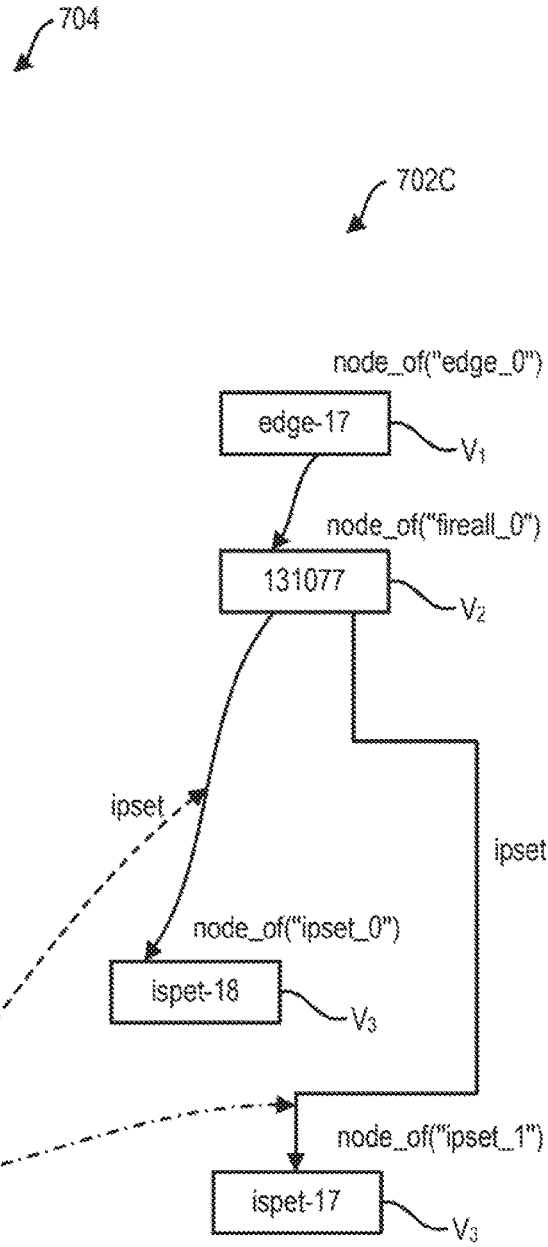

FIG. 7C illustrates a CDAG 702C resulting from the third pass on the correlation export JSON file 704 in an accordance with an embodiment of the invention. In this figure, the entry $T_1$ in the templates section of the configuration export JSON file, i.e., "firewall", includes references to "ipset_1" and "ipset_0", which are the correlation keys $K_4$ and $K_3$, respectively. Thus, the identifier $P_1$ of the entry $T_1$ get defined as $K_4$ and then $K_3$. Thus, a first edge is drawn from the node_of("firewall_0") to the node_of("ipset_0") and a second edge is drawn from the node_of("firewall_0") to the node_of("ipset_1").

The fourth pass on the configuration export JSON file involves blocks 616 and 618. At block 616, for each graph node $V_i$, which is same as the node_of($K_i$), if there exists no outgoing edge to any object or construct in the system, the node_of($K_i$) is annotated with "no correlation". Next, at block 618, each "no correlation" graph node is visually indicated with a visual effect to inform the user that a replacement must be specified for the construct represented by that graph node according to the destination computing environment, which can be done just before initiating migration of policies to the destination environment. As an example, the visual effect of the "no correlation" graph nodes may be a bold border, a predefined color, such as red, or a display of an adequate message. Thus, a final CDAG of the dependencies of the SDN component is generated, which can be displayed on a display device, such as a computer monitor.

In the example shown in FIG. 7C, the graph node $V_3$ and $V_4$ do not have outgoing edges. However, this is due to the fact that the correlation export JSON file is only a partial file for the sake of brevity and thus, the resulting CDAG is abridged. A full correlation export JSON file is illustrated in FIG. 3, and a complete CDAG 500 produced using the full correlation export JSON file is illustrated in FIG. 5. As shown in FIG. 5, the CDAG 500 has three graph nodes 502, 504 and 506 that do not have any outgoing edges. Thus, each of these graph nodes would be declared "no correlation". In addition, these "no correlation" graph nodes would be visually indicated to show the user that a replacement needs to be specified for each of these graph nodes in accordance with the destination computing environment. In FIG. 5, the "no correlation" graph nodes 502, 504 and 506 are illustrated with bold borders.

In an embodiment, the above operation may be performed as the configuration export file is being generated. As an example, some of the information needed for the CDAG may be collected during the execution of recursive dependency-externalization routines, as described in the simultaneously filed patent application, titled "System and Method for Migrating Configurations of Software-Defined Network Components." Thus, some of the passes for the above operation to generate the CDAG may be avoided. In this embodiment, both the configuration export file and the CDAG may be generated in parallel for an SDN component. Additionally, the passes may be combined together into one pass for more optimized implementation.

The generated CDAG may be used with graph-comparison tools that operate on directed graphs, which are known, to perform various operations to assist administrator to analyze various issues regarding migration of SDN component configurations. As an example, the generated correlation directed may allow a user to specify user inputs for one or more nodes of the CDAG by allowing the user to directly edit and store a value for a node when that node is right-clicked using a mouse. As another example, the generated correlation directed may allow a user to add, remove, drag-and-drop a link or dependency, which can be an operation on an edge, or a set of edges in the entire path from root to bottom of the CDAG. As another example, the generated correlation directed may allow a user to make different versions by editing one or more values in the CDAG, which can then be compared with other versions, such as a previous version. The versions are values are tracked using "version", "oldValue" and "newValue" fields for the correlation keys. As another example, the generated correlation directed may allow a user to compare two CDAGs to visually compare the states before and after migration.

Figure 8:
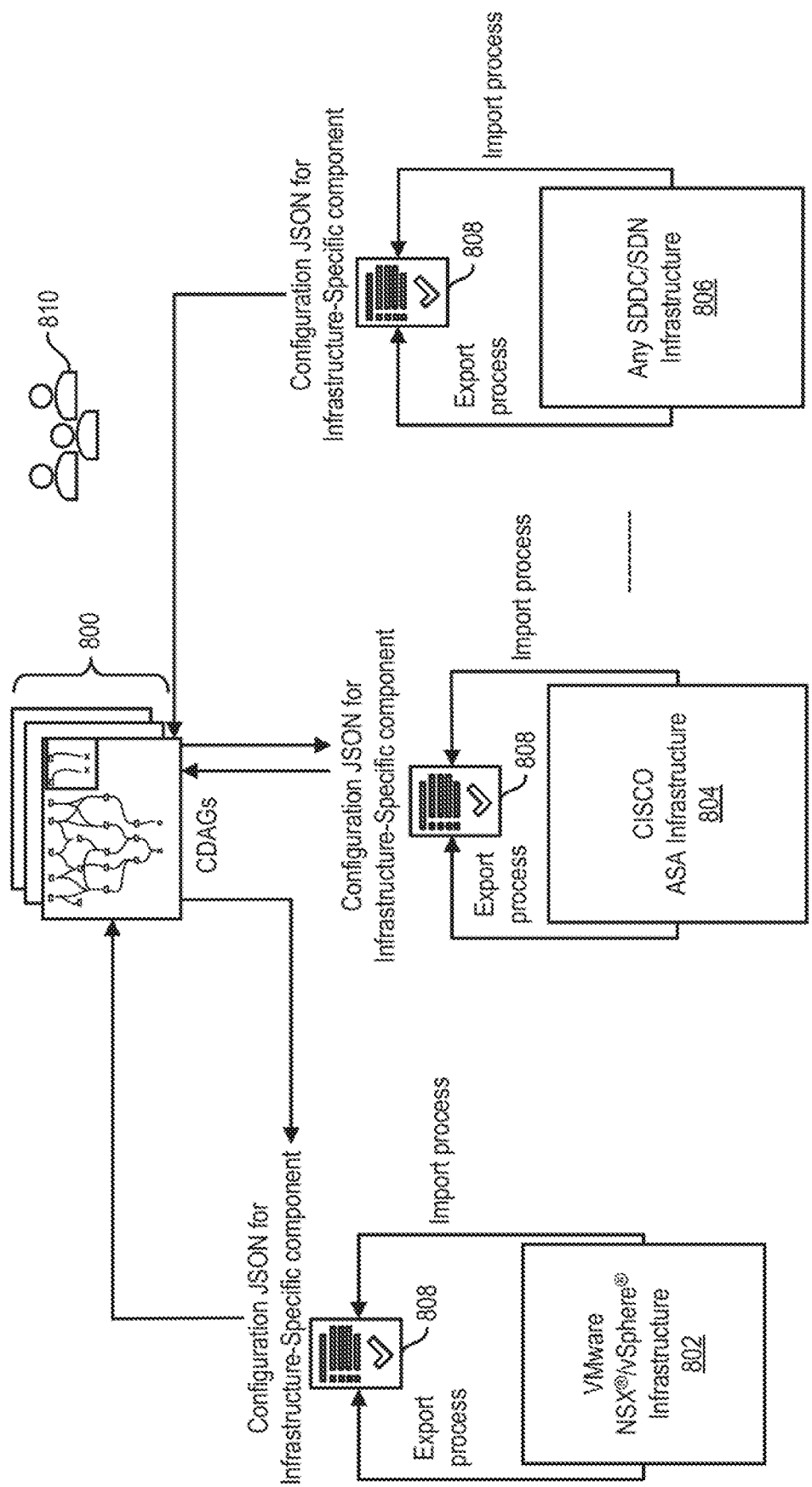
FIG. 8 is a diagram showing that a CDAG can be generated for any component in any infrastructure in accordance with an embodiment of the invention.

The operation described above may be applied to any component in any infrastructure to generate a CDAG for that component. As illustrated in FIG. 8, a CDAG 800 for any components in a VMware NSX®/vSphere® infrastructure 802, a Cisco Adaptive Security Appliance (ASA) infrastructure 804 or any SDDC/SDN infrastructure 806 of any provider can be generated using the operation described herein. For each of these infrastructures, a corresponding configuration JSON file 808 for an infrastructure-specific component can be created and applied for component migration using export and import processes, as described in the simultaneously filed patent application, titled "System and Method for Migrating Configurations of Software-Defined Network Components." Each of these unique configuration JSON files can then be used to generate a CDAG, which may be copied or revised to different versions. The CDAG for a particular component can then manipulated by users 810 via various user operations, which may include value editing and various editing of edges, links or nodes in the CDAG, including add and delete operations. In an embodiment, a drag and drop operation is enabled for the CDAG so that users can easily edit the CDAG.

Figure 9:
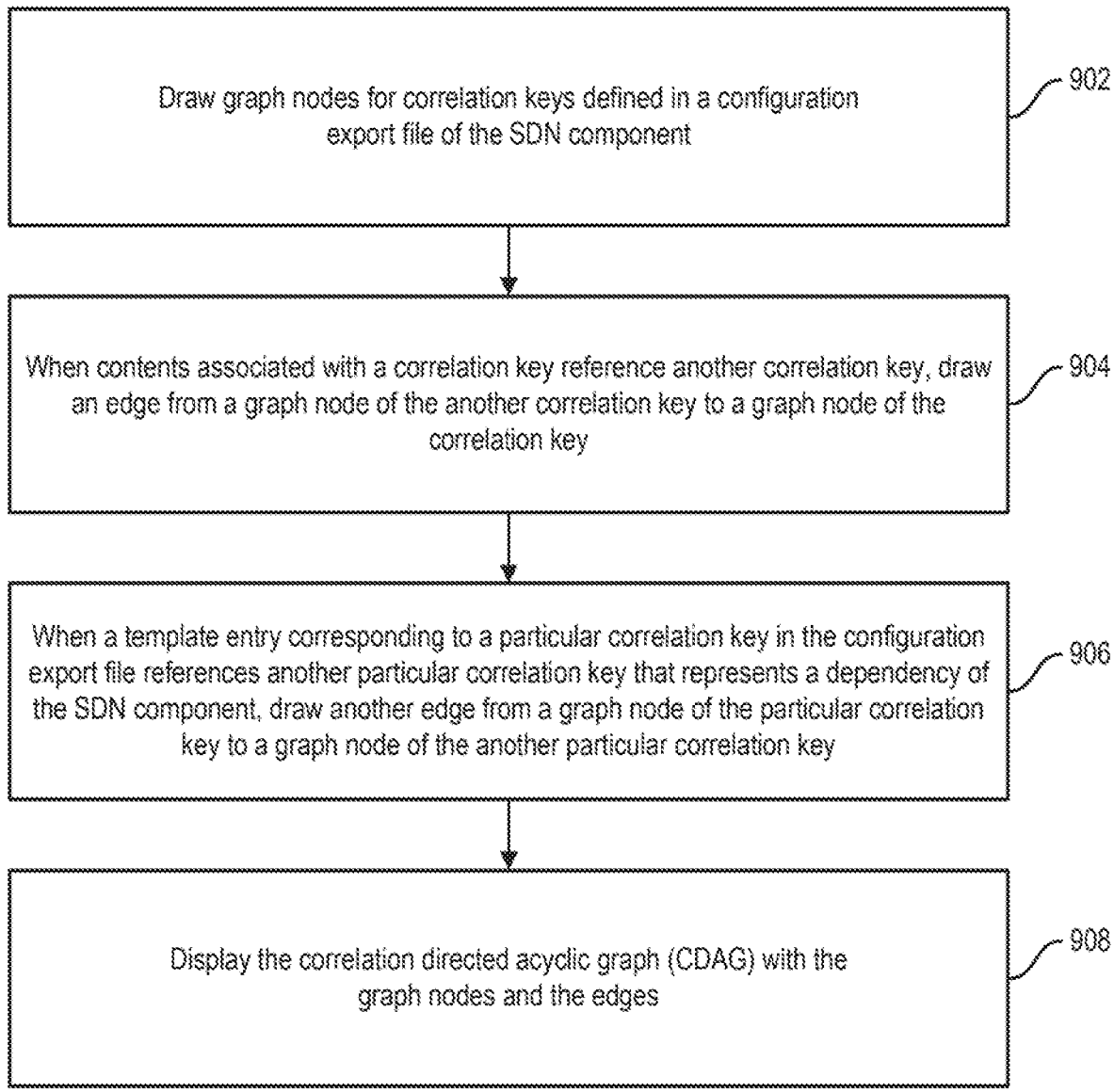
FIG. 9 is a process flow diagram of a computer-implemented method for generating a CDAG of configurations of a software-defined network (SDN) component for migration from a source computing environment to a destination computing environment in accordance with an embodiment of the invention.

A computer-implemented method for generating a correlation directed acyclic graph (CDAG) of configurations of a software-defined network (SDN) component for migration from a source computing environment to a destination computing environment in accordance with an embodiment of the invention is described with reference to a flow diagram of FIG. 9. At block 902, graph nodes for correlation keys defined in a configuration export file of the SDN component are drawn. The configuration export file includes information to configure the SDN component in the destination computing environment. At block 904, when contents associated with a correlation key reference another correlation key, an edge is drawn from a graph node of the another correlation key to a graph node of the correlation key. At block 906, when a template entry corresponding to a particular correlation key in the configuration export file references another particular correlation key that represents a dependency of the SDN component, another edge is drawn from a graph node of the particular correlation key to a graph node of the another particular correlation key. At block 908, the CDAG with the graph nodes and the edges displayed. The graph nodes illustrate dependencies of the configurations of the SDN components and the edges between the graph nodes illustrate relationships between some of the dependencies.

Although some of the embodiments of the invention have been described as being applied to a hybrid cloud environment, various embodiments of the invention can be applied to multi-cloud environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for generating a correlation directed acyclic graph (CDAG) of configurations of a software-defined network (SDN) component, the method comprising:
   drawing graph nodes for correlation keys defined in a configuration export file of the SDN component, the configuration export file including information to configure the SDN component in a destination computing environment;
   when contents associated with a correlation key reference another correlation key, drawing an edge from a graph node of the another correlation key to a graph node of the correlation key;
   when a template entry corresponding to a particular correlation key in the configuration export file references another particular correlation key that represents a dependency of the SDN component, drawing another edge from a graph node of the particular correlation key to a graph node of the another particular correlation key; and
   displaying the CDAG with the graph nodes and the edges, wherein the graph nodes illustrate dependencies of the configurations of the SDN components and the edges between the graph nodes illustrate relationships between some of the dependencies.

2. The computer-implemented method of claim 1, further comprising setting a visual text of each of the graph nodes as an initial value of the corresponding correlation key in a source computing environment.

3. The computer-implemented method of claim 2, further comprising changing the visual text of each of the graph nodes to a new value corresponding to the destination computing environment in response to user input.

4. The computer-implemented method of claim 1, further comprising, for each of the graph nodes without an outgoing edge, declaring that graph node has no correlation.

5. The computer-implemented method of claim 4, further comprising, visually indicating each graph node that has no correlation with a visual effect.

6. The computer-implemented method of claim 1, wherein the particular correlation key is an identifier of the template entry.

7. The computer-implemented method of claim 1, wherein the configuration export file is a JSON file.

8. A non-transitory computer-readable storage medium containing program instructions for method for generating a correlation directed acyclic graph (CDAG) of configurations of a software-defined network (SDN) component, wherein execution of the program instructions by one or more processors of a computer system causes the one or more processors to perform steps comprising:
   drawing graph nodes for correlation keys defined in a configuration export file of the SDN component, the configuration export file including information to configure the SDN component in a destination computing environment;
   when contents associated with a correlation key reference another correlation key, drawing an edge from a graph node of the another correlation key to a graph node of the correlation key;
   when a template entry corresponding to a particular correlation key in the configuration export file references another particular correlation key that represents a dependency of the SDN component, drawing another edge from a graph node of the particular correlation key to a graph node of the another particular correlation key; and
   displaying the CDAG with the graph nodes and the edges, wherein the graph nodes illustrate dependencies of the configurations of the SDN components and the edges between the graph nodes illustrate relationships between some of the dependencies.

9. The non-transitory computer-readable storage medium of claim 8, wherein the steps further comprise setting a visual text of each of the graph nodes as an initial value of the corresponding correlation key in a source computing environment.

10. The non-transitory computer-readable storage medium of claim 9, wherein the steps further changing the visual text of each of the graph nodes to a new value corresponding to the destination computing environment in response to user input.

11. The non-transitory computer-readable storage medium of claim 8, wherein the steps further comprise, for each of the graph nodes without an outgoing edge, declaring that graph node has no correlation.

12. The non-transitory computer-readable storage medium of claim 11, wherein the steps further comprise visually indicating each graph node that has no correlation with a visual effect.

13. The non-transitory computer-readable storage medium of claim 8, wherein the particular correlation key is an identifier of the template entry.

14. The non-transitory computer-readable storage medium of claim 8, wherein the configuration export file is a JSON file.

15. A system comprising:
   memory; and
   at least one processor configured to:
      draw graph nodes for correlation keys defined in a configuration export file of a software-defined network (SDN) component, the configuration export file including information to configure the SDN component in a destination computing environment;
      when contents associated with a correlation key reference another correlation key, draw an edge from a graph node of the another correlation key to a graph node of the correlation key;
      when a template entry corresponding to a particular correlation key in the configuration export file references another particular correlation key that represents a dependency of the SDN component, draw another edge from a graph node of the particular correlation key to a graph node of the another particular correlation key; and
      display a correlation directed acyclic graph (CDAG) with the graph nodes and the edges, wherein the graph nodes illustrate dependencies of the configurations of the SDN components and the edges between the graph nodes illustrate relationships between some of the dependencies.

16. The system of claim 15, wherein the at least one processor is configured to set a visual text of each of the graph nodes as an initial value of the corresponding correlation key in a source computing environment.

17. The system of claim 16, wherein the at least one processor is configured to change the visual text of each of the graph nodes to a new value corresponding to the destination computing environment in response to user input.

18. The system of claim 15, wherein the at least one processor is configured to, for each of the graph nodes without an outgoing edge, declare that graph node has no correlation.

19. The system of claim 18, wherein the at least one processor is configured to virtually indicate each graph node that has no correlation with a visual effect.

20. The system of claim 15, wherein the configuration export file is a JSON file.

\* \* \* \* \*